United States Patent
Guo et al.

(10) Patent No.: US 10,267,947 B2
(45) Date of Patent: Apr. 23, 2019

(54) SIGNAL STABILIZATION AND CALIBRATION FOR NEUTRON DETECTION

(71) Applicant: Halliburton Energy Services, Inc., Houston, TX (US)

(72) Inventors: Weijun Guo, Houston, TX (US); Da Lou, Houston, TX (US); Ronald E. Cherry, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 94 days.

(21) Appl. No.: 15/500,842

(22) PCT Filed: Sep. 29, 2014

(86) PCT No.: PCT/US2014/058093
§ 371 (c)(1),
(2) Date: Jan. 31, 2017

(87) PCT Pub. No.: WO2016/053250
PCT Pub. Date: Apr. 7, 2016

(65) Prior Publication Data
US 2017/0212270 A1    Jul. 27, 2017

(51) Int. Cl.
*G01T 1/40* (2006.01)
*G01V 5/12* (2006.01)
*G01V 5/10* (2006.01)

(52) U.S. Cl.
CPC .............. *G01V 5/12* (2013.01); *G01T 1/40* (2013.01); *G01V 5/107* (2013.01)

(58) Field of Classification Search
None
See application file for complete search history.

(56) References Cited

U.S. PATENT DOCUMENTS 3,214,587 A * 10/1965 Monaghan .............. G01T 1/208
250/262
3,413,472 A * 11/1968 Caldwell ................ G01V 5/104
250/265

(Continued)

FOREIGN PATENT DOCUMENTS

| WO | 2014126571 A1 | 8/2014 |
| WO | 2016053250 A1 | 4/2016 |

OTHER PUBLICATIONS

EP Application Serial No. 14902956.3; EP Extended Search Report; dated Feb. 27, 2018, 8 pages.

(Continued)

*Primary Examiner* — David P Porta
*Assistant Examiner* — Djura Malevic
(74) *Attorney, Agent, or Firm* — Gilliam IP PLLC

(57) ABSTRACT

A neutron detection apparatus, method, and system includes a scintillation device that emits photons in response to received neutron energy incident on the device. A gamma radiation source, coupled to the scintillation device and configured to emit a reference energy, is also detected by the scintillation device. The reference energy has a different energy than the neutron radiation. A light sensor is coupled to the scintillation device. The light sensor receives and converts the emitted photons into an electrical signal comprising an indication of both the reference energy and the received neutron energy.

20 Claims, 6 Drawing Sheets

(56) References Cited

U.S. PATENT DOCUMENTS

| | | | | |
|---|---|---|---|---|
| 3,691,378 | A * | 9/1972 | Hopkinson | G01V 5/102 250/264 |
| 4,300,043 | A * | 11/1981 | Robbins | G01V 5/10 250/262 |
| 4,380,701 | A * | 4/1983 | Smith, Jr. | G01V 5/101 250/266 |
| 4,471,435 | A * | 9/1984 | Meisner | G01V 5/102 250/262 |
| 4,879,463 | A * | 11/1989 | Wraight | E21B 47/011 250/254 |
| 6,064,068 | A * | 5/2000 | Bartle | G01T 1/202 250/252.1 |
| 7,633,058 | B2 * | 12/2009 | Stoller | G01V 5/107 250/265 |
| 7,800,052 | B2 * | 9/2010 | Gadot | G01V 5/04 250/261 |
| 8,173,954 | B2 * | 5/2012 | Duraj | G01V 5/04 250/262 |
| 8,389,941 | B2 * | 3/2013 | Bendahan | G01T 1/167 250/363.02 |
| 9,329,302 | B2 * | 5/2016 | Stoller | G01V 5/06 |
| 9,702,990 | B2 * | 7/2017 | Mickael | G01T 7/005 |
| 2010/0116978 | A1 * | 5/2010 | Stoller | G01T 1/202 250/262 |
| 2011/0204243 | A1 * | 8/2011 | Bendahan | G01T 1/167 250/367 |
| 2011/0272570 | A1 * | 11/2011 | Xu | G01V 5/107 250/269.4 |
| 2013/0105679 | A1 * | 5/2013 | Climent | E21B 49/00 250/269.2 |
| 2017/0315260 | A1 * | 11/2017 | Stoller | G01V 5/105 |
| 2017/0322340 | A1 * | 11/2017 | Zhou | G01V 5/045 |

OTHER PUBLICATIONS

Giacomelli, et al., "Tomographic Analysis of Neutron and Gamma Pulse Shape Distributions from Liquid ScintillationsDetectorsat Joint European Torus", Review of Scientific Instruments, AIP, Melville, NY, US vol. 85, No. 2, Feb. 12, 2014.

"International Application Serial No. PCT/US2014/058093, International Search Report dated Jun. 15, 2015", 3 pgs.

"International Application Serial No. PCT/US2014/058093, Written Opinion dated Jun. 15, 2015", 10 pgs.

Mexican Application Serial No. MX/a/2017/002215; MX First Office Action; dated Jun. 13, 2018, 5 pages.

* cited by examiner

SIGNAL STABILIZATION AND CALIBRATION FOR NEUTRON DETECTION

BACKGROUND

This disclosure relates generally to nuclear logging tools employed in subterranean wells including stabilizing and calibrating neutron detectors in such tools.

In the context of fossil fuel exploration, methods and tools have been developed to search and exploit potential reservoirs of fossil fuels, which are more difficult to access (e.g., deeper in the ground and/or subsea). In some cases, measurements of formation porosity and density are used to identify potential oil and gas reserves as well as to estimate the volume of the reserve.

Nuclear logging tools are sometimes used to measure the interactions between radiation emitted from such a tool and the formation, as well as naturally occurring radiation. Tools including neutron detector(s) are sometimes employed to measure formation porosity and lithology.

DETAILED DESCRIPTION

Figure 1:
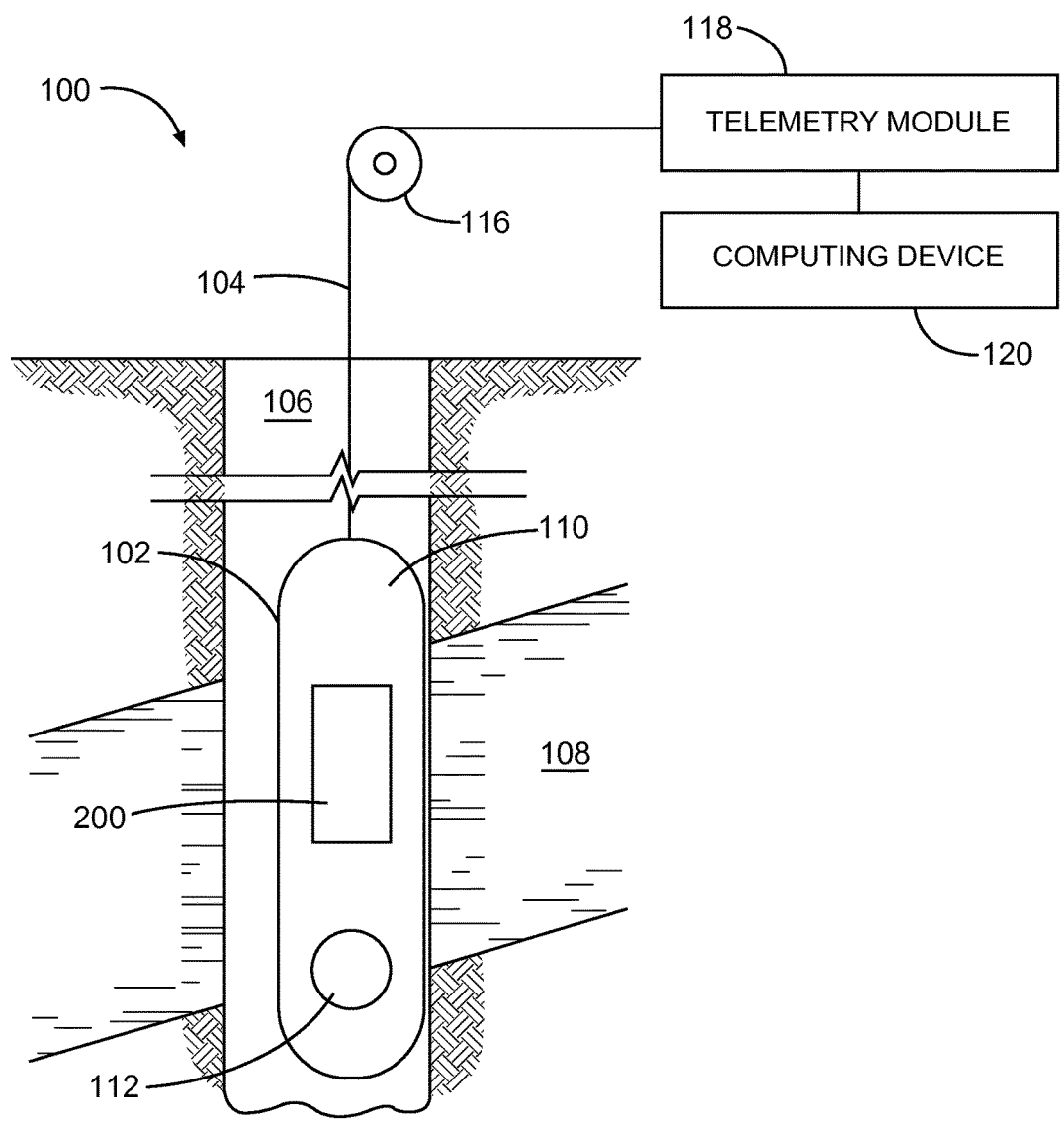
FIG. 1 shows a diagram of an embodiment of a nuclear logging system in accordance with this disclosure.
Figure 2:
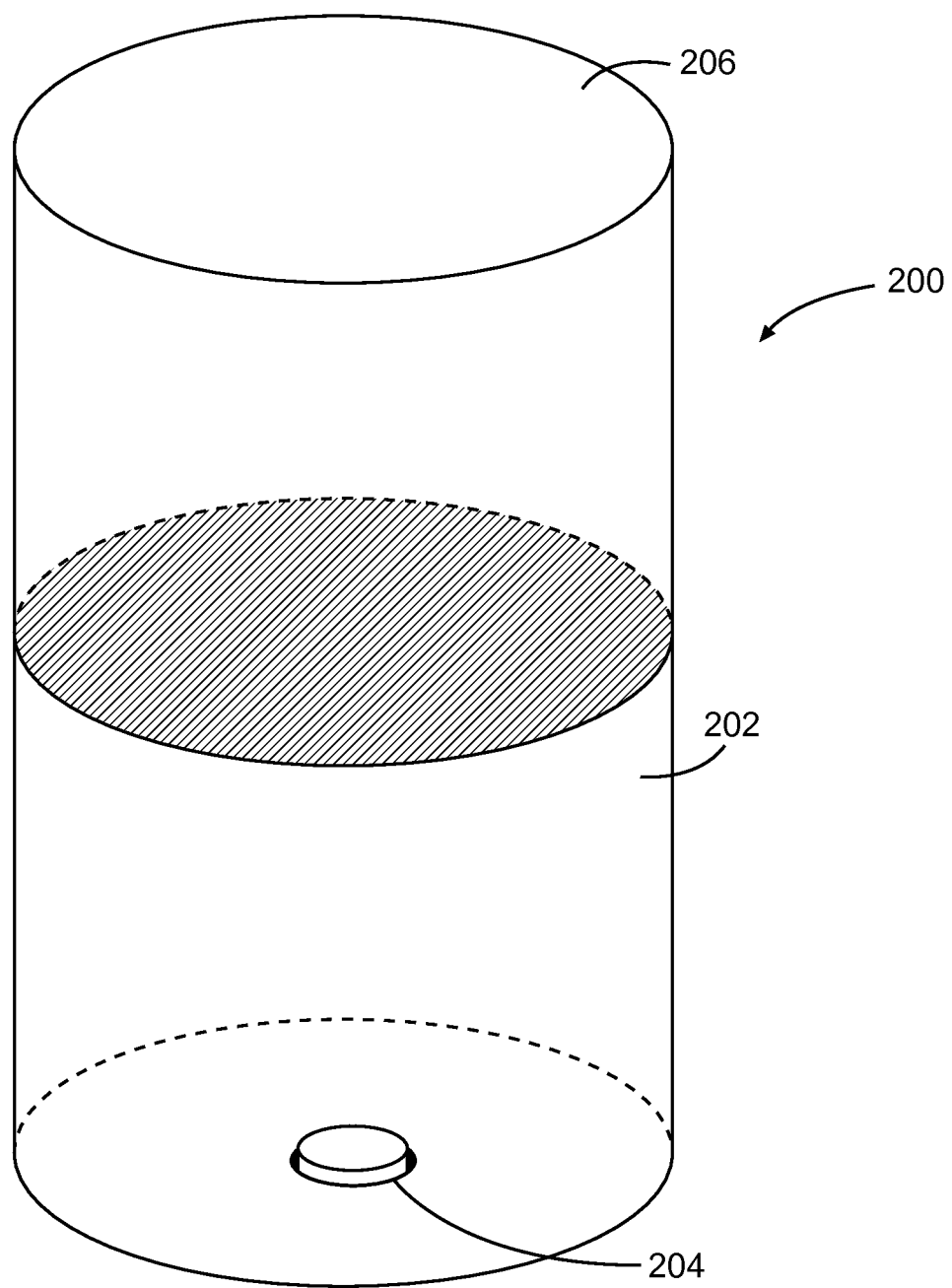
FIG. 2 shows a diagram of an embodiment of a neutron detection apparatus in accordance with this disclosure.

FIG. 1 illustrates an embodiment of a nuclear logging system 100 in accordance with this disclosure. Logging system 100 includes a nuclear logging tool 102 (e.g., wireline sonde) suspended from a cable 104. In an embodiment, the nuclear logging tool 102 is placed within a borehole 106 proximate to a geological formation 108 of interest. The logging tool 102 can include a pressure vessel 110 within which various components of the tool 102 reside. The tool 102 includes a radiation source 112 and a neutron detection apparatus 200 of the present disclosure, as seen in FIG. 2.

The nuclear logging tool 102 can be raised or lowered within the borehole 106 by way of a cable 104. The depth of the tool 102 within the borehole 106 can be determined by a depth measurement system that, in the embodiment of FIG. 1, comprises a depth wheel 116. However, in other embodiments, a different depth measurement system can be employed.

The cable 104 can be a multi-conductor armored cable that can provide support for the vessel 110 and can communicatively couple the nuclear logging tool 102 to a surface telemetry module 118 and surface computer 120. The nuclear logging tool 102 can include a telemetry module 118 that is configured to communicate data related to radiation measurements made by the neutron detection apparatus 200 via the cable 104.

The embodiment of the nuclear logging tool 102 depicted in FIG. 1 is in the context of a wireline tool including cable 104 that can contain one or more electrical conductors to provide power and an apparatus for transmitting signals to/from the tool 102 and a surface computer 120. However, in other embodiments, the nuclear logging tools in accordance with this disclosure can be deployed within a subterranean borehole by other mechanisms. For example, nuclear logging tool 102 can be coupled to a jointed or coiled tubing tool string. More generally, nuclear logging tools in accordance with this disclosure can be deployed in a borehole with any suitable carrier, including any device, device component, combination of devices, media and/or member that may be used to convey, house, support or otherwise facilitate the use of a logging tool in a borehole. Example carriers include tubular members (such as drill pipe, production tubing, a drill string, etc.), slickline, coiled tubing, etc. Additionally, as described below with reference to FIG. 6, an example nuclear logging tool according to this disclosure can be employed in combination with measurement-while-drilling (MWD) and/or logging-while-drilling (LWD) tools.

The nuclear logging tool 102 can be employed to determine one or more properties (e.g., porosity, density, and lithology) of a geological formation 108. Although not shown in FIG. 1, the nuclear logging tool 102 can include one or more radiation detection devices in addition to the neutron detection apparatus 200. In an embodiment, the neutron detection apparatus 200 can include a scintillation detector (e.g., Lithium-6 scintillator, Li-6 scintillator) that is configured to detect neutrons emitted from the geological formation 108 as a result of radiation transmitted into the formation by the radiation source 112.

In the petroleum industry, helium-3 (H-3) neutron detectors are widely used in nuclear logging applications due to their durability and effectiveness in such applications. However, a shortage of H-3 has motivated the development of alternative types of detectors. Among the current alternatives to H-3 neutron detectors, Li-6 scintillators provide a rugged and ready design, which has a record of performance in the field.

Scintillators can have a relatively high gamma radiation response and, as such, signal processing techniques can be used to distinguish between neutron and gamma signals of a Li-6 detector. However, when the background gamma radiation is high, the quality of this discrimination can be reduced.

In the embodiment of FIG. 1, the neutron detection apparatus 200 can be in the form depicted in and discussed relative to FIG. 2. The apparatus 200 can be configured to receive and convert the emitted neutrons into an electrical signal that can be communicated via the cable 104 and the surface telemetry module 118 to the surface computing device 120 for processing and analysis. For logging tools not carried by wireline, the measured data or measurements derived therefrom may be communicated by other suitable telemetry systems known in the art.

FIG. 2 illustrates an embodiment of the neutron detection apparatus 200 in accordance with this disclosure. The neutron detection apparatus 200 can include an annular sleeve scintillation device 202, a gamma-radiation source 204, and a light sensor 206. The scintillation device 202 can be fabricated from a Li-6 scintillating material that emits photons in response to neutron radiation incident on the device as well as the gamma-radiation reference energy that has a different energy than the neutron energy.

The light sensor 206 is coupled to the scintillation device 202. The light sensor 206 can include a variety of sensors such as a photomultiplier tube (PMT) or photodiode. The light sensor 206 is configured to receive and convert photons emitted by the scintillation device 202 into an electrical signal to be used by a computing device 120 on the surface that can be configured to execute a signal stabilization and calibration method as described subsequently. The electrical signal used by the computing device 120 comprises an indication of both the neutron energy and the reference gamma radiation energy.

In practice, the scintillating neutron detection apparatus 200 can be employed in a subterranean nuclear logging tool along with a radiation source configured to emit radiation into a surrounding formation. In one example, the radiation source is configured to emit fast neutrons into the formation. Some of the neutrons emitted by the radiation source towards the formation lose energy being "thermalized" through inelastic collisions within nuclei of materials that make up the formation. Some portion of the thermal neutrons can be deflected back towards the neutron detection apparatus 200. The neutron detection apparatus 200 detects, with nuclei inside the Li-6 scintillating material of the scintillation device 202, some of the thermal neutrons that return when the neutrons react with the formation.

In response to the incident neutrons, the Li-6 scintillating material of scintillation device 202 exhibits the property of luminescence. Thus, the Li-6 scintillating material of the scintillation device 202, when struck by an incoming neutron, absorbs the energy of the neutrons and re-emits the absorbed energy in the form of light. The light sensor 206 is configured to absorb the light emitted by the Li-6 scintillating material of the scintillation device 202.

The light sensor 206 absorbs and re-emits the light in the form of electrons via the photoelectric effect. The light sensor 206 can also be configured to multiply the electrons to produce an electrical pulse which can then be analyzed to yield meaningful information about the particle that originally struck the scintillation device 202 of the neutron detection apparatus 200.

In an embodiment, the light sensor 206 includes a PMT or a photo diode. When a charged particle strikes the Li-6 scintillating material of the scintillation device 202, atoms of the device 202 are excited and photons are emitted. The photons emitted by the Li-6 scintillating material of the scintillation device 202 are directed at a photocathode of the light sensor 206, which emits electrons by a photoelectric effect. These electrons are electrostatically accelerated and focused by an electrical potential so that they strike a first dynode of the light sensor 206. The impact of a single electron on the dynode releases a number of secondary electrons which are in turn accelerated to strike the second dynode of the light sensor 206. Each subsequent dynode impact releases further electrons that produces a current amplifying effect at each dynode stage. Each stage of the light sensor 206 is at a higher potential than the previous to provide the accelerating field. The resultant output electrical signal, at an anode of the light sensor 206, is in the form of a measurable pulse for each photon detected at the photocathode. The electrical pulse produced by the light sensor 206 can be transmitted to a computing device for processing and analysis to determine one or properties of the formation including, for example, porosity, density, lithology, and/or other properties.

The gamma radiation emitter 204 can include any radionuclide that emits gamma radiation. For example, the gamma radiation emitter 204 can be caesium-137, barium-137, cobalt-60, iridium-192, iodine-131, or lanthanum-140. Typical prior art neutron detectors filter out any gamma radiation that is captured by the scintillating material. As discussed subsequently, with reference to FIGS. 3 and 4, the gamma radiation emitter 204 emits a known energy that is used as a reference energy in stabilizing and calibrating the neutron detection apparatus 200.

The efficiency of the neutron detection apparatus 200 can be expressed as the likelihood a neutron incident on the Li-6 scintillating material of the scintillation device 202 will be detected. The probability of a capture reaction of a neutron by a nucleus of the Li-6 material can be described by a cross-section of the reaction and depends on the incoming neutron's energy.

A calculable amount of energy (Q) is emitted as a result of the neutron capture reaction. The emitted energy may be kinetic energy of the resulting particles or gamma rays (photons, light). The energy is dissipated, for example, when the neutron capture reaction by-products pass through the Li-6 scintillating material of the scintillation device 202 causing emission of light. As noted above, at least some of the light emitted following a neutron capture reaction of the Li-6 scintillating material of scintillation device 202 reaches light sensor 206, and generates a signal recognizable as a signature of the reaction. The energy emitted from the Li-6 scintillating material of the scintillation device 202 is generally proportional to the amplitude of the signature electrical signal produced by light sensor 206.

Figure 3:
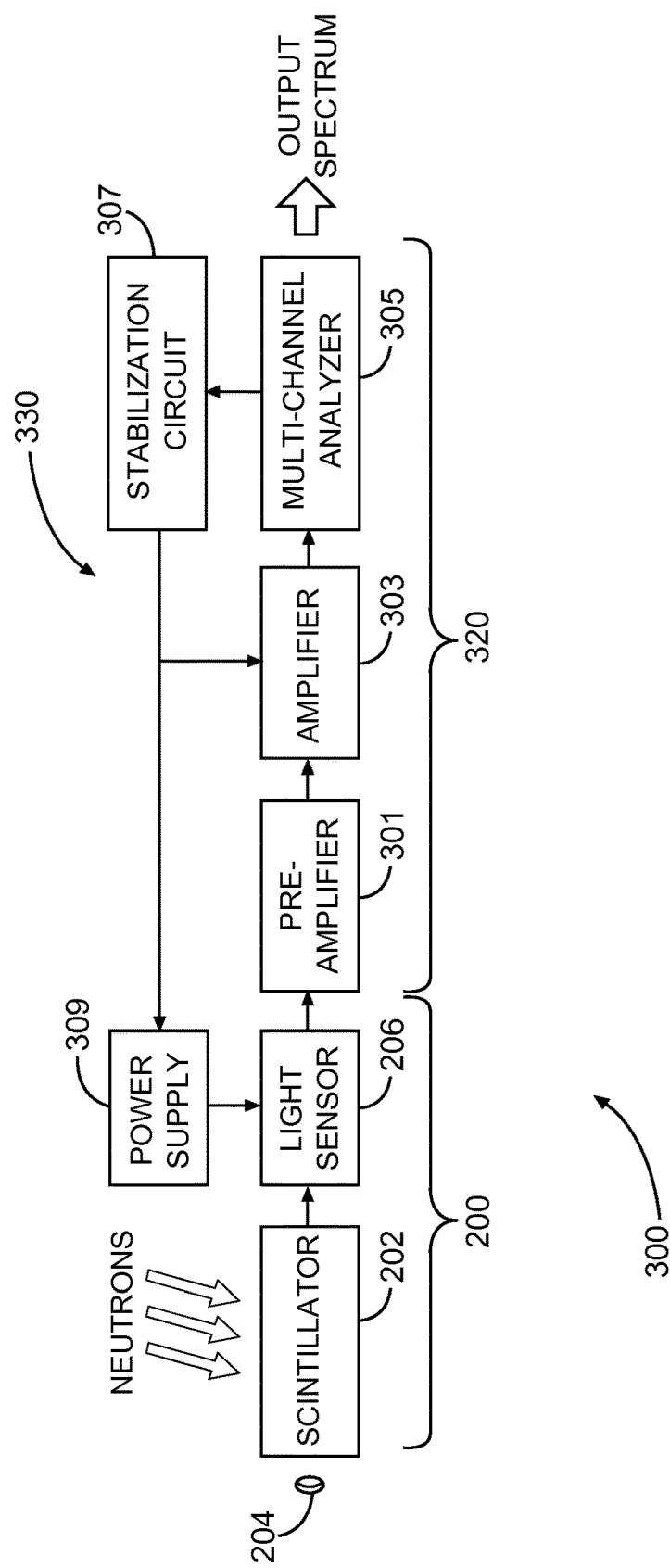
FIG. 3 shows a block diagram of an embodiment of a neutron detection system including the neutron detection apparatus in accordance with this disclosure.

FIG. 3 illustrates a block diagram of a neutron detection system that can provide signal stabilization and calibration in accordance with this disclosure. In an embodiment, a portion 320 of this system can be part of the computing device 120 illustrated in FIG. 1. Other embodiments can include that portion 320 of this system as separate from the computing device 120, such as located in the nuclear logging tool 102 with the neutron detection apparatus 200.

The output of the neutron detection apparatus 200 can be coupled to a pre-amplifier circuit 301. The pre-amplifier can take the relatively low amplitude signals from the light sensor 206 and amplify them for use by an amplifier circuit 303 without substantially degrading the signal-to-noise ratio (SNR) of the PMT signal.

The output of the pre-amplifier circuit 301 is coupled to an input of the amplifier circuit 303. The amplifier circuit 303 can further increase the amplitude of the signal from the pre-amplifier circuit 301.

Figure 4:
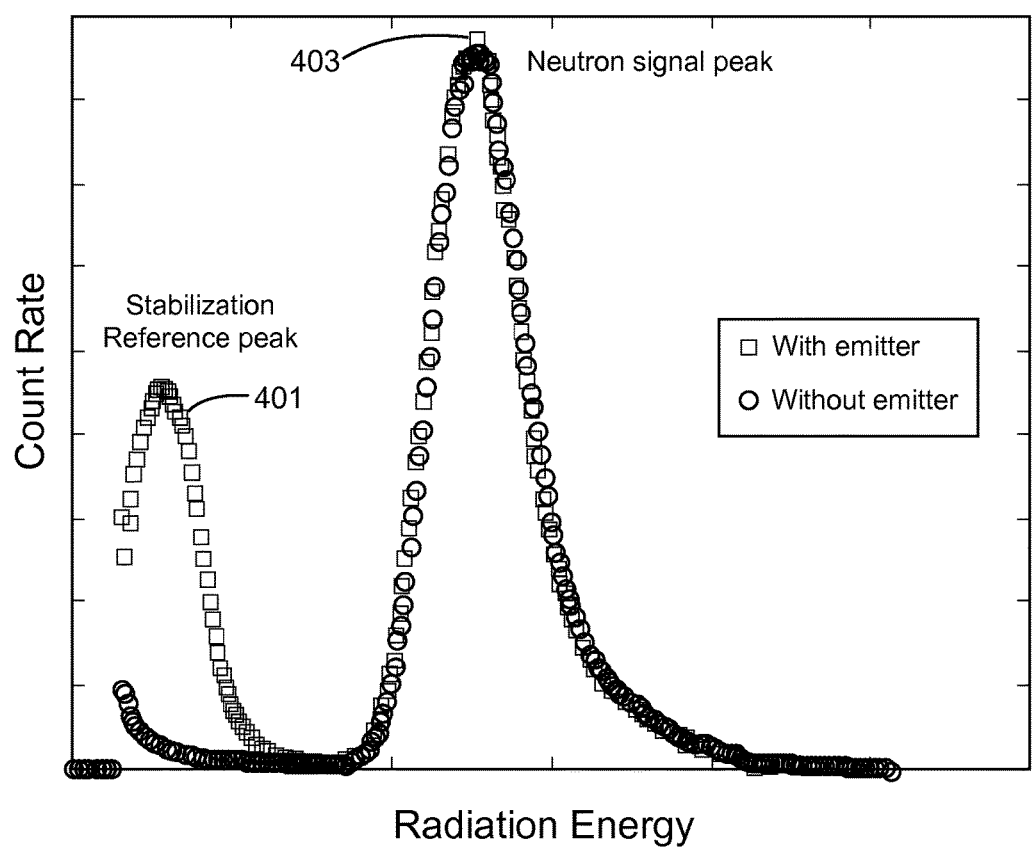
FIG. 4 shows a graph of radiation count levels across different energy levels in accordance with this disclosure.

The output of the amplifier is coupled to an input of a multi-channel analyzer 305. Each channel of the analyzer corresponds to a different possible radiation energy, as seen in FIG. 4. For example, a first channel can correspond to the gamma radiation reference energy. Since different geological formations might transmit back neutrons at a different energy in response to a transmitted radiation, the multi-channel analyzer can have additional different channels for each of those reflected energies.

Referring to FIG. 4, the gamma radiation source 204 emits radiation at a known energy 401. This known energy 401 can be used as a stabilization reference peak 401 for the received neutron energy peak 403. In practice, the entire radiation spectrum will move in response to different geological formations. However, the relative distance between the stabilization reference peak 401 and the neutron energy peak 403 will remain substantially fixed.

Thus, referring again to FIG. 3, the multi-channel analyzer 305 can be set to receive and recognize the neutron peak 403 relative to the stabilization reference peak 401. The neutron energy pulse received by the neutron detection apparatus 200 and provided by the pre-amplifier circuit 301 and amplifier circuit 303 can be shaped by the multi-channel analyzer 305. The multi-channel analyzer takes the voltage signal produced by the detector 200, reshapes it into a Gaussian or trapezoidal shape, and converts that signal into a digital signal, representative of a spectrum of the received neutron energy, to be output as the output spectrum.

The system 300 also includes a feedback path 330 that includes a stabilization circuit 307. The stabilization circuit 307 has an input coupled to an output of the multi-channel analyzer 305 and an output coupled to inputs of both the amplifier circuit 303 and a light sensor power supply 309. The stabilization circuit 307 can adjust the gains of the amplifier circuit 303 and the light sensor power supply 309 based on the response detected and converted by the multi-channel analyzer 305. Thus, the amplifier circuit 303 and power supply 309 can be calibrated to the reference gamma-radiation energy such that the gains provided by the amplifier circuit 303 and the power supply 309 (e.g., light sensor) are only applied to the signal from the light sensor during the peaks of the received neutron energy.

Figure 5:
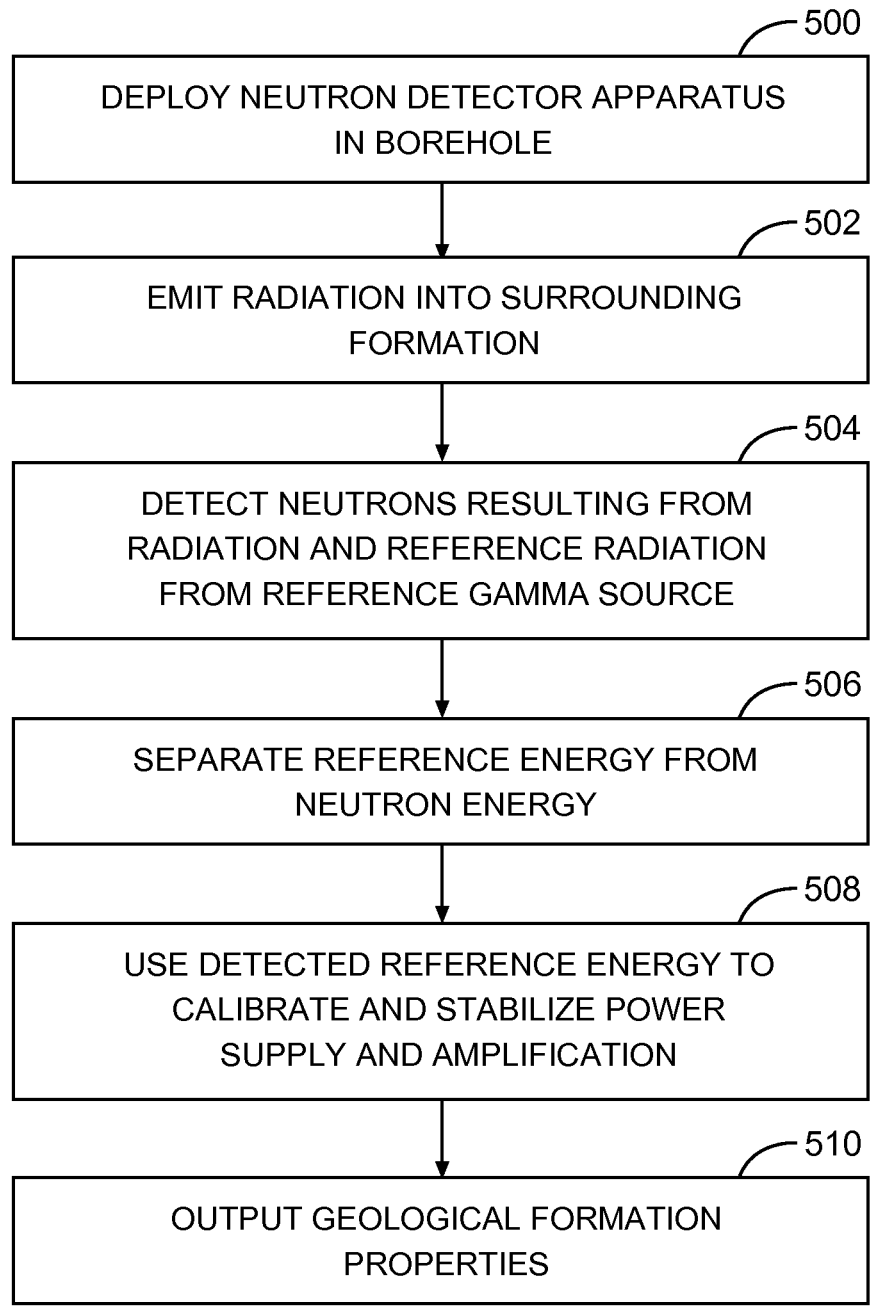
FIG. 5 shows a flowchart of an embodiment of a method for detecting neutron radiation in a borehole in accordance with this disclosure.

FIG. 5 illustrates a flowchart of an embodiment of a method for detecting neutron radiation in a borehole using the neutron detection apparatus 200 and system 300 illustrated previously. The embodiment of FIG. 5 includes deploying the neutron detection apparatus 200 into the borehole adjacent a geological formation at block 500.

In practice, the nuclear logging tool 102 can include a radiation source 112 configured to emit radiation, at block 502, into a surrounding formation 108. In one embodiment, the radiation source 112 can be configured to emit fast neutrons into the formation 108. Some of the neutrons emitted by the radiation source 112 towards the formation 108 lose energy or are "thermalized" through inelastic collisions within nuclei of materials that make up the formation. The thermal neutrons are deflected back towards the neutron detection apparatus 200. The neutron detection apparatus 200, at block 504, detects some of the thermal neutrons that return when the neutrons react with nuclei inside the Li-6 scintillating material of the scintillation device 202 of the detector. The neutron detection apparatus 200, at block 504, also detects the gamma radiation that is used as a reference.

In response to the incident neutrons and the reference gamma radiation, the Li-6 scintillating material of the scintillation device exhibits the property of luminescence. Thus, the Li-6 scintillating material of the device, when struck by incoming neutrons and gamma radiation, absorbs the energy and re-emits the absorbed energy in the form of light. The light sensor is configured to detect the light emitted by the Li-6 scintillating material of the device and convert the light into a voltage signal via the photoelectric effect. The light sensor can also be configured to multiply the electrons (e.g., PMT) to produce an electrical pulse.

The system 300 can then separate detected gamma reference energy from the neutron returned energy at block 506. The power supply and amplification of the detected light (e.g., neutron energy and gamma radiation reference energy), at block 508, are calibrated and stabilized with respect to the reference energy. This can be accomplished by feeding back, from the multi-channel analyzer to the amplifier and power supply, the relative distance between the reference stabilization energy peak and the neutron energy peak.

The properties of the geological formation are output at block 508 from the multi-channel analyzer as the spectrum signal. As discussed previously, the neutron energy deflected back to the neutron detection apparatus 200 can indicate the properties of the geological formation.

Figure 6:
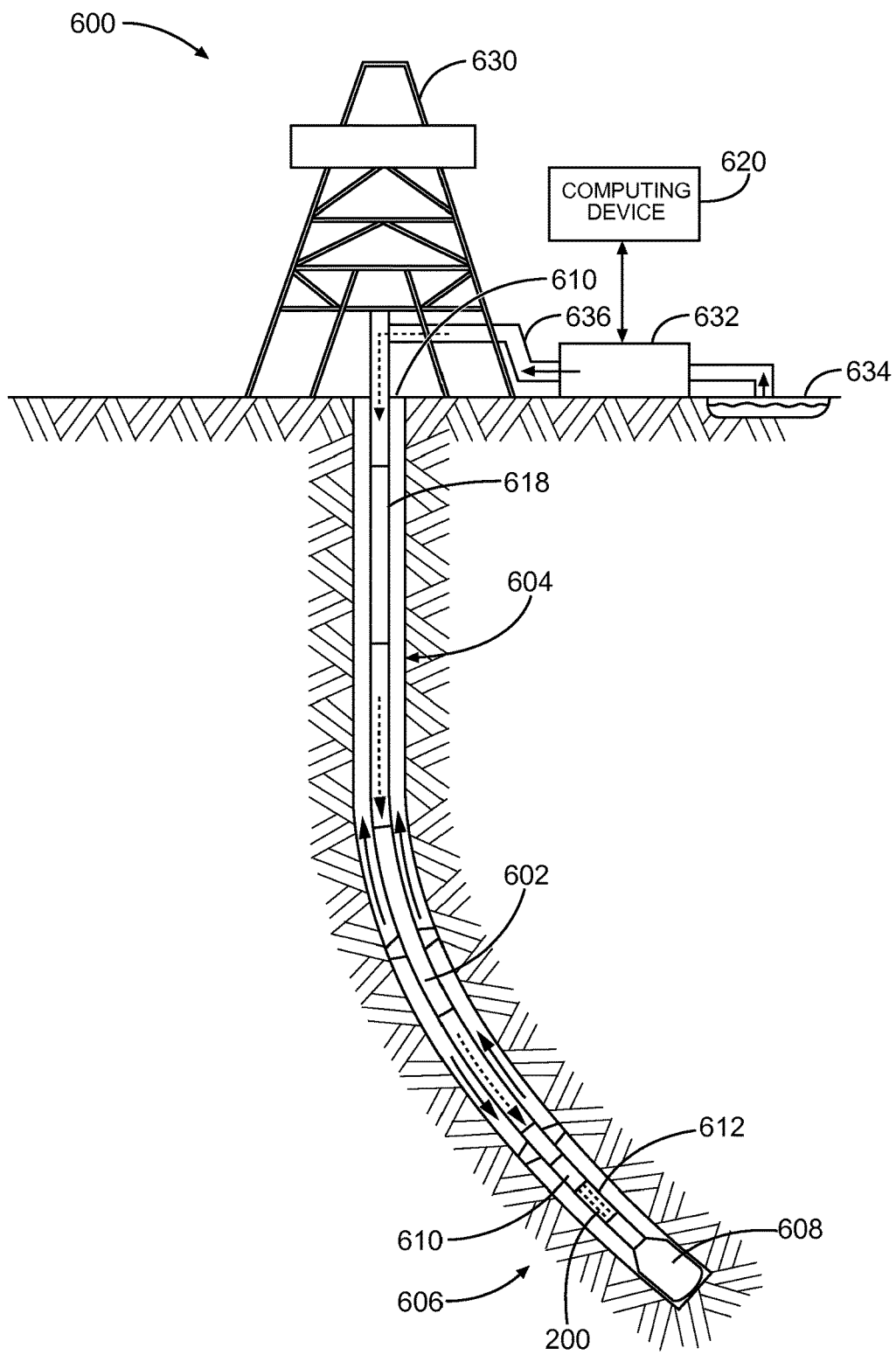
FIG. 6 shows a diagram of an embodiment of a drilling system including the neutron detection apparatus in accordance with this disclosure.

As noted above, embodiments of nuclear logging tools in accordance with this disclosure can be deployed within a subterranean borehole by a number of different mechanisms, including MWD and/or LWD tools. FIG. 6 depicts an example drilling installation 600 including MWD/LWD tool string 602 suspended within wellbore 604, a bottom hole assembly (BHA) 606 including a drill bit 608 and other equipment used in the drilling process. Tool string 602 includes a number of MWD/LWD tools, as indicted at 610, 612, at least one of which can include the neutron detection apparatus 200 in accordance with embodiments of this disclosure.

FIG. 6 illustrates how a system 600 can also form a portion of a drilling rig 630 located at the surface of a well 610. The drilling rig 630 may provide support for the drill string 602. The drill string 602 may operate to penetrate the rotary table 610 for drilling the borehole 604 through subsurface formations.

During drilling operations, a mud pump 632 may pump drilling fluid (sometimes known by those of ordinary skill in the art as "drilling mud") from a mud pit 634 through a hose 636 into the drill pipe 618 and down to the drill bit 608. The drilling fluid can flow out from the drill bit 608 and be returned to the surface through an annular area between the drill pipe 618 and the sides of the borehole 604. The drilling fluid may then be returned to the mud pit 634, where such fluid is filtered. In some embodiments, the drilling fluid can be used to cool the drill bit 608, as well as to provide lubrication for the drill bit 608 during drilling operations. Additionally, the drilling fluid may be used to remove subsurface formation cuttings created by operating the drill bit 608.

A computing device 620 can include the system 300 of FIG. 3 for determining the type of geological formations through which the drill bit 608 is moving. The computing device 620 can then control the orientation of the drill bit 608 in response to the signals received from the neutron detection apparatus 200. The computing device can include modules for performing these various tasks.

Such modules may include hardware circuitry, and/or a processor and/or memory circuits, software program modules and objects, and/or firmware, and combinations thereof. The modules can include a non-transitory machine-readable storage device that can comprise instructions stored thereon that, when performed by a machine, cause the machine to perform operations. The operations can comprise one or more operations as illustrated in the method of FIG. 5.

A machine-readable storage device, herein, is a physical device that stores data represented by physical structure within the device. Examples of non-transitory machine-readable storage devices can include, but are not limited to, read only memory (ROM), random access memory (RAM), a magnetic disk storage device, an optical storage device, a flash memory, and other electronic, magnetic, and/or optical memory devices.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A neutron detection apparatus comprising:
a scintillation device that emits photons in response to neutron energy incident on the device;
a gamma radiation source coupled to the scintillation device and configured to emit a reference energy signal that is detectable by the scintillation device and having a different energy than the neutron energy;
a light sensor coupled to the scintillation device, the light sensor configured to receive and convert the emitted photons into an electrical signal comprising an indication of both the reference energy and the neutron energy;
an amplifier that receives and is configured to amplify the electrical signal;
a multichannel analyzer that receives the amplified electrical signal, wherein the multichannel analyzer is configured to separate the portion of the amplified electrical signal comprising an indication of the reference energy from the portion of the amplified electrical signal comprising an indication of the neutron energy; and
a stabilization circuit that receives the indication of the reference energy and is configured to feedback the indication of the reference energy to the light sensor and to the amplifier.

2. The neutron detection apparatus of claim 1, wherein the scintillation device comprises at least a portion of an annular sleeve comprising lithium-6 material.

3. The neutron detection apparatus of claim 1, wherein the light sensor comprises one of a photomultiplier tube (PMT) or a photodiode.

4. The neutron detection apparatus of claim 1, wherein the gamma radiation source comprises at least one of: caesium-137, barium-137, cobalt-60, iridium-192, iodine-131, or lanthanum-140.

5. The neutron detection apparatus of claim 1, wherein energy emitted by the scintillation device is proportional to an amplitude of the electrical signal.

6. A neutron detection system comprising:
a neutron detection apparatus comprising:
a scintillating device comprising scintillating material that emits photons in response to received neutron radiation and a gamma radiation reference energy;
a gamma radiation emitter in the scintillating device and configured to generate the gamma radiation reference energy; and
a light sensor device coupled to the scintillating device and configured to receive and convert the emitted photons into an electrical signal comprising indications of the neutron radiation and the gamma radiation reference energy; and
a computing device coupled to the neutron detection apparatus, the computing device comprising:
an amplifier that receives and is configured to amplify the electrical signal;
a multi-channel analyzer that receives the amplified electrical signal and is configured to separate the indications of the neutron radiation and the gamma radiation reference energy and output the neutron radiation indication; and
a stabilization circuit coupled to the multichannel analyzer and configured to feedback the indication of the gamma radiation reference energy to the light sensor and the amplifier, wherein a gain of the light sensor and the gain of the amplifier are adjusted in response to the indication of the gamma radiation reference energy to provide an adjusted gain that is applied to the electrical signal during peaks of the received neutron energy.

7. The neutron detection system of claim 6, further comprising an amplifier circuit coupled between the light sensor and the multi-channel analyzer wherein the stabilization circuit is coupled to the amplifier such that a gain of the amplifier circuit is applied during the peaks of the received neutron energy.

8. The neutron detection system of claim 7, further comprising a pre-amplifier circuit coupled between the neutron detection apparatus and the amplifier circuit.

9. The neutron detection system of claim 6, wherein the light sensor further comprises a power supply wherein the stabilization circuit is coupled to the power supply of the light sensor such that gain provided by the power supply to the electrical signal is applied during the peaks of the received neutron energy.

10. The neutron detection system of claim 6, wherein one channel of the multi-channel analyzer corresponds to the gamma radiation reference energy.

11. The neutron detection system of claim 10, wherein additional channels of the multi-channel analyzer correspond to peaks in received neutron radiation based on the one channel.

12. The neutron detection system of claim 6, wherein the output neutron radiation output comprises a digital signal that is representative of a spectrum of the received neutron radiation.

13. A method for detecting neutron radiation, the method comprising:
detecting light generated by a scintillating device in response to received neutron energy and gamma radiation reference energy on the scintillating device;
generating, by a light sensor, an electrical signal in response to the light, comprising indications of the received neutron energy and the gamma radiation reference energy;
amplifying by an amplifier the electrical signal;
separating the indication of the received neutron energy and the indication of the gamma radiation reference energy; and
applying the indication of the gamma radiation reference energy to the light sensor and the amplifier to produce an amplified indication of the neutron energy.

14. The method of claim 13, further comprising:
lowering a neutron detector apparatus into a borehole through a geological formation;
emitting radiation into the geological formation; and
receiving the neutron energy from the geological formation in response to the emitted radiation.

15. The method of claim 14, wherein lowering the neutron detector apparatus into the borehole comprises lowering a wireline sonde comprising the neutron detector apparatus.

16. The method of claim 14, wherein lowering the neutron detector apparatus into the borehole comprises lowering a drill string comprising the neutron detector apparatus and further comprising controlling an orientation of a drill bit of the drill string based on the amplified indication of the neutron energy.

17. The method of claim 13, further comprising:
analyzing the amplified indication of the neutron energy; and generating an indication of geological formation properties based on the amplified indication of the neutron energy.

18. The method of claim 17 wherein generating the indication of the geological formation properties comprises generating a digital signal.

19. The method of claim 13, wherein applying the gain to the indication of the received neutron energy further comprises calibrating and stabilizing, with respect to the indication of the gamma radiation reference energy, a light source power supply gain and amplifier circuit gain of a signal from the light source.

20. The method of claim 19, wherein applying the light source power supply gain and the amplifier circuit gain are applied to received neutron energy peaks based on the indication of the gamma radiation reference energy.

* * * * *